United States Patent
Turnbull

(10) Patent No.: US 7,198,718 B1
(45) Date of Patent: Apr. 3, 2007

(54) COALESCER

(75) Inventor: Robert William Turnbull, Fife (GB)

(73) Assignee: Opus Plus Limited, Flotta, Stromness, Orkney (GB)

( * ) Notice: Subject to any disclaimer, the term of this patent is extended or adjusted under 35 U.S.C. 154(b) by 0 days.

(21) Appl. No.: 09/720,755

(22) PCT Filed: Jun. 28, 1999

(86) PCT No.: PCT/GB99/02029

§ 371 (c)(1),
(2), (4) Date: Feb. 20, 2001

(87) PCT Pub. No.: WO00/00261

PCT Pub. Date: Jan. 6, 2000

(30) Foreign Application Priority Data

Jun. 27, 1998 (GB) .................................. 9813864.7

(51) Int. Cl.
*B01D 17/02* (2006.01)
(52) U.S. Cl. .......................... 210/232; 55/484; 96/186; 210/512.1; 210/513; 210/DIG. 5
(58) Field of Classification Search ................ 210/693, 210/799, 800, 232, 513, 532.1, DIG. 5
See application file for complete search history.

(56) References Cited

U.S. PATENT DOCUMENTS

| | | | | |
|---|---|---|---|---|
| 3,405,511 A | | 10/1968 | Halter et al. ................... | 55/440 |
| 3,794,583 A | * | 2/1974 | Rhodes ......................... | 210/649 |
| 3,810,832 A | | 5/1974 | Rhodes ......................... | 23/210 |
| 4,299,699 A | | 11/1981 | Boogay | |
| 4,411,791 A | * | 10/1983 | Ward ............................ | 210/649 |
| 4,640,781 A | | 2/1987 | Hughes ........................ | 210/520 |
| 4,869,814 A | * | 9/1989 | Hughes et al. ............... | 210/142 |
| 5,480,547 A | * | 1/1996 | Williamson et al. ......... | 210/533 |
| 5,616,244 A | * | 4/1997 | Seureau et al. .............. | 210/295 |

FOREIGN PATENT DOCUMENTS

| | | |
|---|---|---|
| DE | 3111554 | 4/1982 |
| GB | 970518 | 9/1964 |

* cited by examiner

*Primary Examiner*—Peter A. Hruskoci
(74) *Attorney, Agent, or Firm*—Drinker, Biddle & Reath LLP

(57) ABSTRACT

A two phase liquid media coalescer comprises a chamber such as a pipe (1) which may be fitted into a process system by way of pressure sealable fittings (23, 24). Contained within the chamber is a coalescer media (5) manufactured from fibers of polypropylene or other material. One end of the fibers may be secured to a media retaining plate (4). The fibers extend through the chamber in the direction of flow and are free at their other end. A two phase liquid enters the pipe and contacts the surface area of the fibers while passing through, thereby forming droplets of the minority phase of the liquid on the fibers.

9 Claims, 2 Drawing Sheets

COALESCER

This invention relates to an apparatus and method for encouraging droplet growth within a two phase liquid feed stream, particularly a liquid phase stream comprising oil and water or solvent and water. However, the invention is applicable to any fluid feed stream in which there are at least two different phases, for example a continuous phase and a dispersed phase, a liquid phase and a non-liquid phase, or a mixture of gas phases such as in gas scrubbing applications.

It has been observed that for a significant number of processes which generate a two phase waste flow the efficiency of liquid treatment plant is no longer providing the desired level of phase removal. This, in many instances, is due to the feed containing relatively significant volumes of the minority phase in the form of small droplets (eg typically of the order of 10 µm or less). These droplets provide a challenge for standard phase separation devices that are commonly used.

Chemical flocculants, downstream skimmed enhancement vessels, centrifuges, media filters and membranes have all been considered as potential enhancement mechanisms to deal with the problems of small droplets.

In many instances the cost or space required to utilise such technologies is limited. If small droplets can be coalesced or "grown" to a greater size, then the existing equipment should perform in a more efficient manner.

U.S. Pat. No. 3,810,832 discloses a coalescing apparatus in which elongated filaments of polypropylene are arranged across the flow of the mixture. The mixture has to pass across the filaments of polypropylene, which therefore impede the flow. U.S. Pat. No. 4,299,699 discloses a combined coalescing/filtration apparatus in which elongated strands of yarn form a cylindrical assembly. The oil-in-water suspension must pass from the outside to the inside of the cylindrical assembly and therefore has to pass perpendicular to the strands, which substantially impede the flow.

It is an object of the present invention to provide an apparatus and method in which droplets in a two phase liquid feed stream can be coalesced to a greater size.

According to a first aspect of the present invention there is provided an apparatus for coalescing droplets of one phase from a liquid comprising two or more phases, the apparatus comprising a chamber, a coalescing medium comprising a plurality of substantially elongate members each having a surface area, means for securing said coalescing medium within said chamber, an inlet to said chamber, and an outlet from said chamber, said inlet and outlet being positioned such that liquid flowing from said inlet to said outlet flows in a flow direction in contact with said surface area of said coalescing medium, the elongate members extending substantially in the flow direction. The longitudinal members may not be perfectly straight, and may be crinkled, creased, twisted or irregularly deformed, but they extend in a direction which is substantially parallel to the flow direction, such that liquid flows along the longitudinal members in contact with the surface area of the coalescing medium.

Preferably said coalescing medium has a high surface area per unit volume. Preferably said coalescing medium comprises a plurality of elongate members in the form of fibres. The fibres may be substantially mutually aligned. Preferably the fibres are of natural, man made or plastic material. The fibres may be polypropylene, metal wire, animal hair, polyethylene, polyester or glass wool. Preferably the coalescing medium comprises one or more polypropylene ropes. However, other forms of fibres are possible, as described below:

Fibres may be prepared in a variety of cross-sectional shapes according to the fluid components and performance required.

The fibres may be either regular or irregular in dimension and solid, hollow or open structured in nature.

The fibres may be formed by spinning, weaving, extruding, moulding or cellular growth as in animal or plant products.

The fibres may be surface modified by smoothing, roughening, chemical coating, precipitation deposition or other commonly available techniques for specific applications.

The fibres may be installed as separate fibres, or as groups or bunches in a single or plaited grouping to increase the tortuosity of the fluid flow path.

The fibres may be treated mechanically, thermally, chemically or by a mixture of treatments to generate a wave or curl along the length of the fibre to increase the tortuosity of the fluid flow path. The fibres may be of greater or lesser density than the flowing fluids.

The fibres may be chosen to react to a naturally occurring or artificially input component of the flowing fluids to promote a change in the property of the fibre. The property changes may include, but are not limited to, a dimensional change due to swelling or shrinking, a decrease or increase in rigidity or a change of interfacial tension between the fluids and the fibres.

Preferably the chamber comprises a substantially straight pipe having a first end and a second end, said outlet being arranged at the first end and an access cover being arranged at the second end. Preferably the access cover is removable such as to allow access to said coalescing medium. In one embodiment the chamber further comprises a branch attached to an intermediate point of said pipe, said inlet being arranged at the free end of said branch. However, this form of inlet and outlet to the coalescing medium is not restrictive and either or both of the inlet and outlet may be inline, perpendicular or tangential to the direction of flow within the vessel or conduit. The inlet and outlet configurations need not be the same, but can be adjusted to suit the design constrictions of the system in which it is placed.

The application of the invention is not restricted to tubular systems, but may be placed in any suitable vessel or conduit which may, or may not, be open to the atmosphere. The chamber of the invention is not to be construed as being limited to a closed chamber, and may be an open channel, for example.

The application of the invention is not limited to flow systems in which the vessel, pipe or conduit is completely filled with the continuous and dispersed phases.

Preferably the apparatus further comprises a retaining member to which the coalescing medium is secured. Depending on the arrangement of the inlet and outlet, the coalescing medium may comprise fibres attached to a single point or to multiple points on the retaining member. The multiple points may be positioned in a plane transverse to the flow direction or in a plane parallel to the flow direction. Suitable attachment devices are apertures in the retaining member, threaded clamps, clamping rings and hooks or loops on the retaining member. The fibres may be bonded to the retaining member by adhesive or melt bonding.

The attachment device for the fibres may include a perimeter sheath within which the fibres are located to promote ease of insertion or extraction from the flowing fluid stream or system.

The attachment device may incorporate protective pads or shields to prevent abrasion damage to the fibres due to detritus in the fluid stream.

Preferably said retaining member is adapted to be removably engaged within said chamber. Preferably the interior of said chamber is provided with a lip adapted to engage with said retaining member. Preferably said access cover is adapted to hold said retaining member against said lip when the access cover is attached to the pipe. Preferably said retaining member is provided with one or more apertures for securing said coalescing medium to said retaining member.

According to a second aspect of the present invention there is provided a method for coalescing droplets of one phase from a liquid comprising two or more phases, in which the liquid is caused to flow through a chamber in which is secured a coalescing medium having a surface area, such that the liquid flows in contact with said surface area of said coalescing medium and droplets of a phase of said liquid coalesce on said surface area. Preferably the method uses an apparatus according to the first aspect of the present invention.

The present invention provides a simple process unit which can either be added to a process system when the system is constructed or be retrofitted into an existing process system to increase the efficiency and/or life of the process system. The coalescer utilises additional surface area within the pipe to assist the minority phase droplets to coalesce.

In one embodiment the apparatus of the invention comprises a length of pipe fitted at each end with a pressure sealable fitting (eg a flange plate, which can be fixed to the pipe by welding, screw thread etc). At one end of the pipe there is a "T" section fitted, with another pressure sealable fitting (eg a flange plate, again fixed by welding, screw thread etc). The pressure sealable fitting on the pipe closest to the "T" section is blanked off, and acts as a service and inspection access point for the coalescing retainer and media.

The coalescing media extends within the pipe through the length of the unit and is retained by a retainer. The media retainer may be of disk type construction, and may have a number of drill holes therethrough to allow the media to be attached. The retainer is constructed from a stainless steel, or other suitable material that will not be prone to corrosion or wear in the environment under which this invention will have to operate. The media retainer is secured in position by appropriate means, for example by clamping between the shoulder of the pipe and the screw fitting of the blanketing plug, or by the retainer being restrained in the pipe by a welded lip/shoulder and being held in position by the flow of fluid around the media. It is envisaged that the coalescing media will be made from fibrous man-made or natural material such as polypropylene rope, metal wire, animal hair, polyethylene, polyester or glass wool.

To ensure that the coalescing media is correct for the accumulation and thus the coalescing of the minority phase this invention will allow for the coalescing media to be fully interchangeable. The size and dimensional shape of the coalescer will be dependent on the flow characteristics of the fluid flowing through the apparatus, such as Reynolds Number, fluid type, dispersed phase size, desired level of dispersed phase coalescence, desired or allowable system pressure drop, system temperature, flow volume, and weight and space restrictions. For example, if a high Reynolds Number is required, a smaller effective cross sectional area is required for the same flow. In the case of a chamber formed by a pipe, this could be achieved by either reducing the pipe diameter, or increasing the cross sectional area that is occupied by the coalescing media. Typically the pipe may be between 10 mm and 100 mm in diameter, although larger pipes may be used.

A specific embodiment of the invention will now be described, by way of example only, with reference to the drawings in which.

Figure 1:
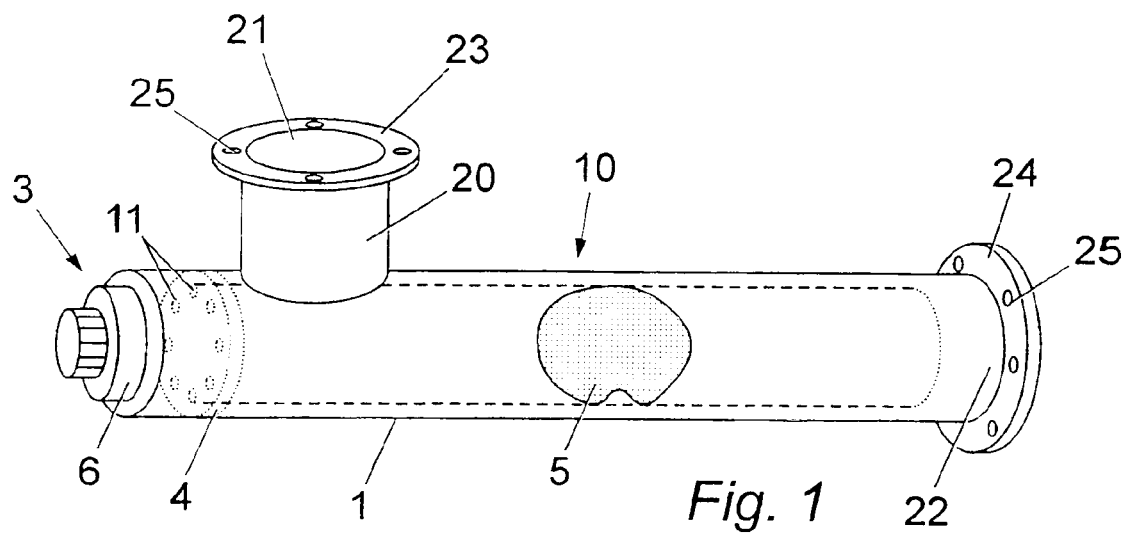
FIG. 1 shows a schematic perspective view of an apparatus according to one embodiment of the invention indicating the location of the pressure sealable fittings, with a partial cut away view showing the coalescing medium inside the pipe.

With reference to FIGS. 1 to 4, the coalescer 10 comprises a pipe 1 of suitable diameter to allow for the required flow characteristics. Typically the coalescer of the example has an internal diameter of 100 mm and a length of 2 m. The pipe 1 has an inlet 21 at the end of an inlet branch 20, which is connected to the pipe near a first end of the pipe. At the second end of the pipe is an outlet 22.

The pipe 1 is fitted into the process system/train by use of the pressure sealable fittings 23, 24, which each comprise flanges provided with apertures 25 for bolted connections.

Inside the pipe 1 are the coalescing media 5, which are supported at one end only by a media retainer plate 4. The media 5 may be bundles 16 of fibres 30 secured through apertures 11 in the media retaining plate 4 by means of a knot 8, as shown in detail in FIG. 3. The fibres 30 are then free to extend along the interior of the pipe towards the second end under the action of liquid flowing along the pipe towards the outlet 22. Alternatively the fibres 30 may be a single bundle 17 of individual fibres folded in half around a media retaining pin 14, and secured to the pin 14 by a tie 18 which encircles the folded bundle 17.

Access to the coalescer media retainer 4, 14 and media 5 is achieved via the inspection and maintenance access point 3. The media retainer 4, 14 may be secured in position by any suitable means. In the example shown in FIG. 2, the media retaining plate 4 is held by the clamping action of a threaded cover plate 6 against a shoulder 7 formed within the pipe 1.

Figure 2:
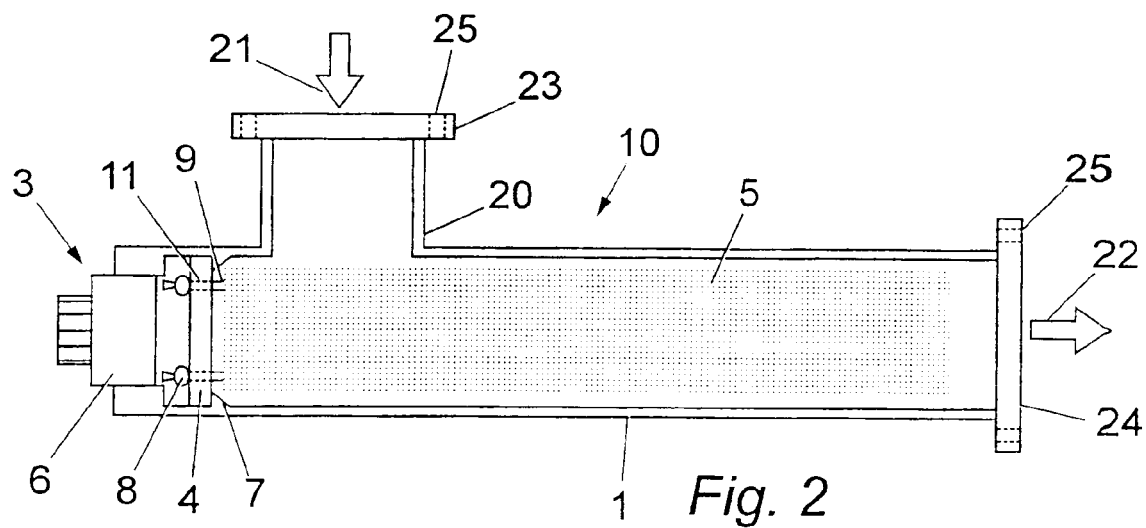
FIG. 2 shows a longitudinal cross section of the apparatus of FIG. 1, indicating the construction of the media retainer and the extent that the coalescing media extends through the unit.
Figure 3:
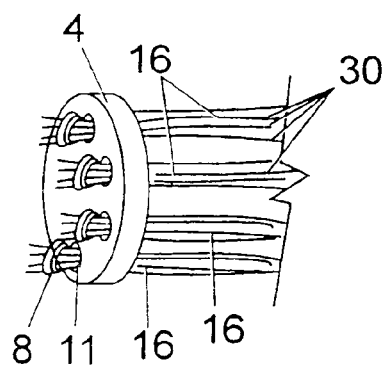
FIG. 3 shows a detail on the retaining plate of the apparatus of FIG. 1.
Figure 4:
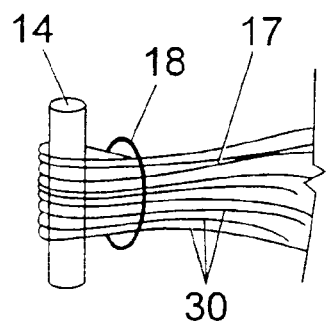
FIG. 4 shows a detail of an alternative to the retaining plate of FIG. 3, in which the coalescing media is secured to a retaining pin.

The coalescer media 5 is attached to the media retainer 4, 14 by any suitable method, depending on the media that is used. If polypropylene rope is used for the media 5, connection is achieved by means of knots 8 tied in the ends, as shown in FIG. 2. The individual ropes or strands 9 of rope are passed through preformed apertures 11 in the media retaining plate 4, so that the knots prevent the rope from becoming detached from the media retaining plate 4. The ropes may alternatively be secured by clamps, glue or thermal fusing, as will be apparent to those skilled in the art. The media 5 may be provided with a sleeve (not shown) which surrounds the fibres nearest the retaining plate 4, in order to protect the fibres 30 during insertion of the media into the pipe. The media 5 may be provided with protective pads or shields (not shown) around the point of attachment to the retaining plate 4, in order to prevent abrasion damage to the fibres 30 due to detritus in the fluid stream.

In use the two phase liquid enters the apparatus through inlet 21 and passes along the pipe 1. The large number of fibres 30 in the coalescing medium 5 means that there is a large surface area of the medium in contact with the fluid as it passes along the pipe 1 to the outlet 22, encouraging the formation and growth of droplets of the minority phase on the fibres 30.

When the coalescing medium 5 needs to be replaced, the cover plate 6 is unscrewed, the media retainer 4, 14 can be removed and a new medium 5 is attached to the retainer 4, 14. Alternatively a new complete unit comprising a retainer 4, 14 with the media preattached is used. The retainer 4, 14 is then reinserted in the pipe 1 and the cover plate 6 screwed in.

The invention offers significant advantages over prior art coalescers. Since the fibres 30 are oriented in the flow direction, there is reduced flow resistance created. The only resistance to flow arises from the shear stress between the liquid and the fibres. This is of particular importance when the apparatus of the invention is used in a low pressure process train. Tests have shown that pressure drops across the coalescer of the invention of less than 1.0 bar may be achieved. This compares with a pressure drop of 1.8 bar when using a prior art hydrocyclone coalescer. The apparatus of the invention can operate successfully under a range of flow conditions, coalescing droplets of less than 10 micron diameter with flow conditions varying from Re (Reynolds Number) 30,000 to 100,000. Tests show that if the invention is used with a hydrocyclone, the efficiency of the hydrocyclone can be improved from 30% to 90% for small droplet sizes.

The coalescer of the invention may be easily retrofitted. It has a low cost, since low cost fibres such as polypropylene, nylon, hemp, cotton and hair may be used for the coalescing fibre. The best results have been obtained with polypropylene in the form of rope, mop or ribbon-type strands such as Sorbaine(™).

The coalescing apparatus of the invention is used to form larger droplets of the minority phase in the fluid stream. Its effectiveness can be measured by the increase in droplet size which it achieves. Larger droplets may be separated more effectively by a cyclone, so that the passing of a fluid stream through a coalescing apparatus according to the invention before passing the fluid stream to a cyclone or other separation device improves the efficiency of the separation device.

EXAMPLES

Figure 5:
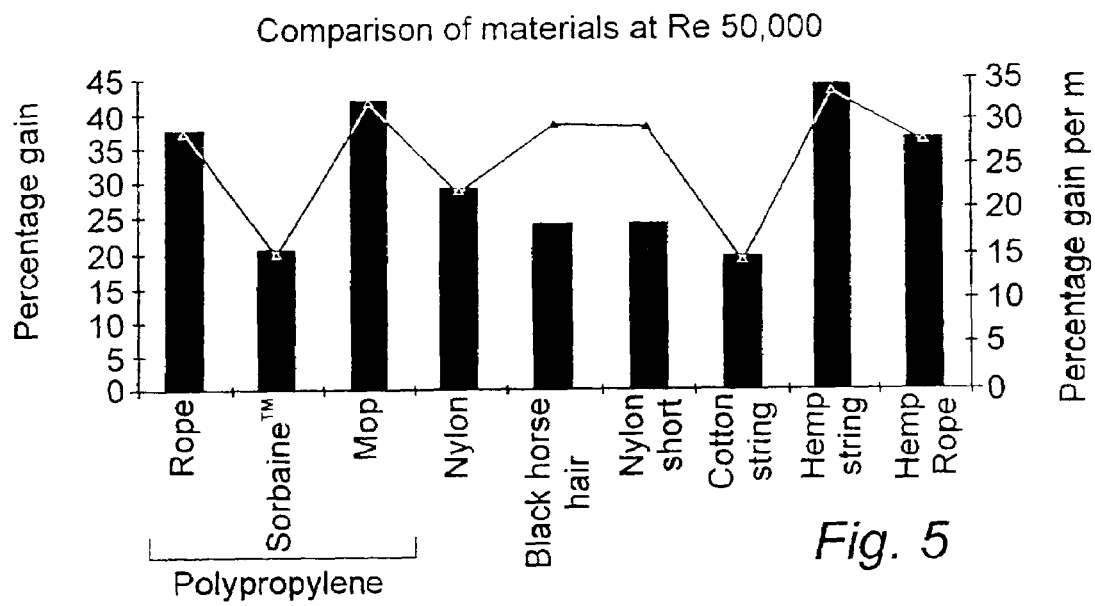
FIGS. 5 to 7 are graphs of results of test carried out using the apparatus of FIG. 1, showing the percentage gain in oil droplet diameter for different coalescing media fibres.
Figure 6:
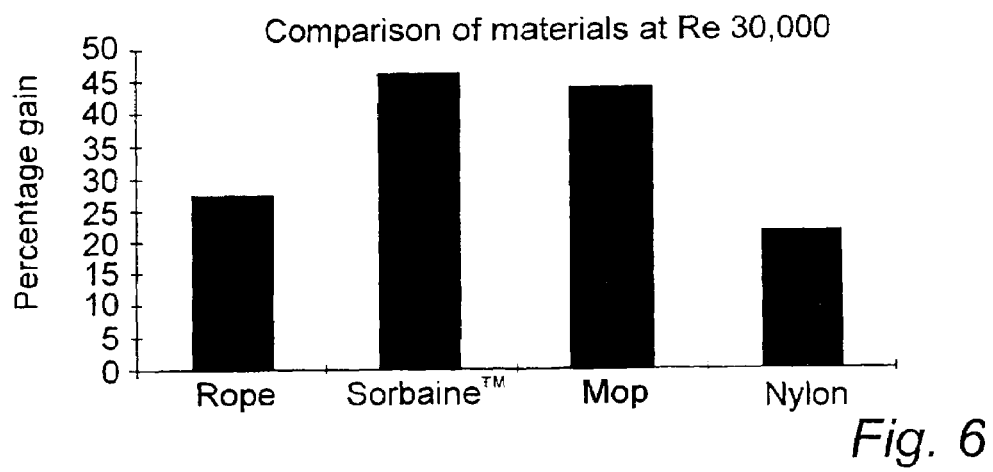
Figure 7:
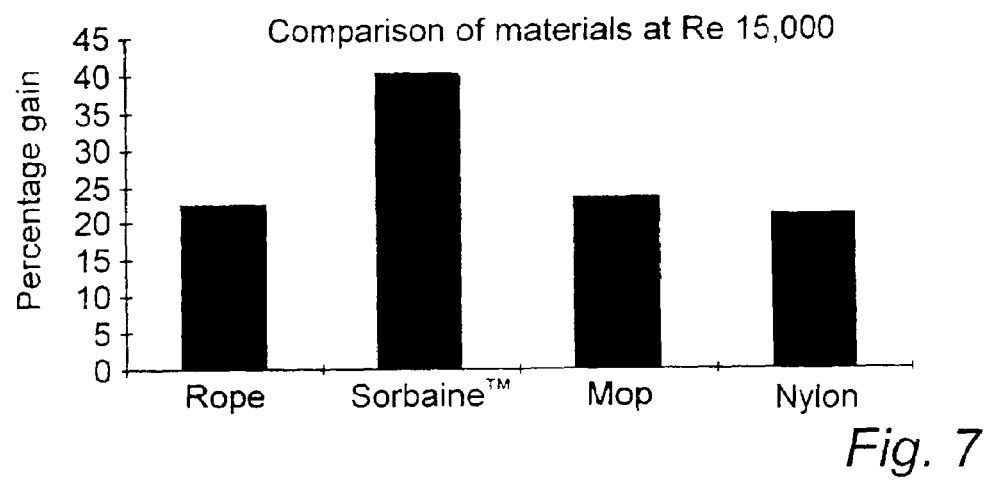

Tests have been carried out to measure the effect on droplet size of different coalescing media. The results, using water and oil at 50° C. in a test apparatus similar to that shown in FIGS. 1 and 2, are shown in FIGS. 5 to 7. Sorbaine(™) is a proprietary polypropylene fibre in ribbon form. FIG. 5 shows that under high flow conditions (Reynolds Number 50,000) polypropylene mop (a tortuous polypropylene fibre) and hemp string achieved oil droplet size growth of more than 40%. FIG. 6 shows that under medium flow conditions (Reynolds Number 30,000) polypropylene mop and Sorbaine both achieved oil droplet size growth of more than 40%. FIG. 7 shows that under low flow conditions (Reynolds Number 15,000) Sorbaine achieved oil droplet size growth of more than 40%.

The modifications described in this specification and other modifications and improvements can be incorporated without departing from the scope of the invention as defined in the appended claims.

The invention claimed is:

1. An apparatus for coalescing droplets of one phase from a fluid comprising two or more phases, said apparatus comprising a chamber, a coalescing medium comprising a plurality of substantially elongate members each having a surface area, a retaining member to which the coalescing medium is secured, an inlet to said chamber, and an outlet from said chamber, said inlet and outlet being positioned such that fluid flowing from said inlet to said outlet flows in a flow direction in contact with said surface area of said coalescing medium, the elongate members extending substantially in the flow direction, characterized in that said chamber is formed from a substantially straight pipe having a first end and a second end and a branch intermediate said first and second ends, the intermediate branch having a free end, wherein the retaining member is located at the second end of the chamber such that the intermediate branch is located between the retaining member and the first end, said outlet being arranged at the first end and an access cover being arranged at the second end, said inlet being arranged at the free end of said branch, wherein said access cover is adapted to allow removal and replacement of the retaining member and coalescing medium, wherein said elongate members are substantially mutually aligned fibres which are supported by the retaining member at one end only and free to extend along the interior of the pipe toward the second end under the action of fluid flowing along the pipe toward the outlet.

2. An apparatus in accordance with claim 1, wherein said retaining member is adapted to be removably engaged within said chamber.

3. An apparatus in accordance with claim 1, wherein the interior of said chamber is provided with a shoulder adapted to engage with said retaining member.

4. An apparatus in accordance with claim 3, wherein said access cover is adapted to hold said retaining member against said shoulder when the access cover is attached to the pipe.

5. An apparatus in accordance with claim 1, wherein said retaining member is provided with one or more apertures for securing said coalescing medium to said retaining member.

6. An apparatus in accordance with claim 1, wherein said coalescing medium comprises ribbon-like fibres.

7. An apparatus in accordance with claim 1, wherein said fibres are selected from the group of materials consisting of polypropylene, metal wire, animal hair, polyethylene, polyester, and glass wool.

8. An apparatus in accordance with claim 1, wherein said coalescing medium comprises one or more polypropylene ropes.

9. An apparatus for coalescing droplets of one phase from a fluid comprising two or more phases, said apparatus comprising a chamber, a coalescing medium comprising a plurality of substantially elongate members each having a surface area, a retaining member to which the coalescing medium is secured, an inlet to said chamber, and an outlet from said chamber, said inlet and outlet being positioned such that fluid flowing from said inlet to said outlet flows in a flow direction in contact with said surface area of said coalescing medium, the elongate members extending substantially in the flow direction, characterised in that said chamber is formed from a substantially straight pipe having a first end and a second end and a branch intermediate said first and second ends, the intermediate branch having a free end, wherein the retaining member is located at the second end of the chamber such that the intermediate branch is located between the retaining member and the first end, said outlet being arranged at the first end and an access cover being arranged at the second end, said inlet being arranged at the free end of said branch, wherein said access cover is adapted to allow removal and replacement of the retaining member and coalescing medium;

said retaining member being adapted to be removably engaged within said chamber;

wherein the interior of said chamber is provided with a shoulder adapted to engage with said retaining chamber, and wherein said elongate members are substantially mutually aligned fibres which are supported by the retaining member at one end only and free to extend along the interior of the pipe toward the second end under the action of fluid flowing along the pipe toward the outlet.

\* \* \* \* \*